Feb. 15, 1944.       R. MARTIN ET AL       2,341,800
METHOD AND MEANS FOR VENTILATING AND FERTILIZING SOIL
Filed May 19, 1941
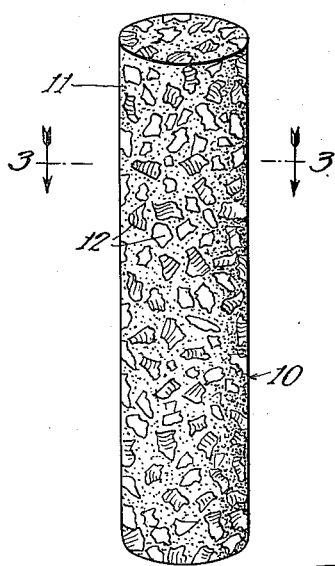
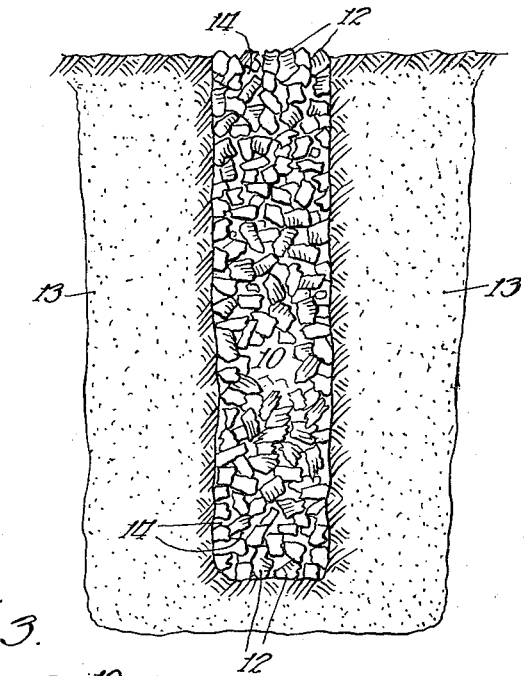
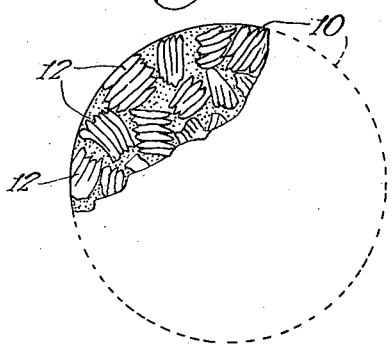
Inventors:
Richard Martin
Harry T. Bellamy
By: Hill and Hill
Attys.
Witness
V. Siljander Patented Feb. 15, 1944

2,341,800

UNITED STATES PATENT OFFICE 2,341,800

METHOD AND MEANS FOR VENTILATING AND FERTILIZING SOIL

Richard Martin, Chicago, and Harry T. Bellamy, Evanston, Ill., assignors to Protectoseal Company of America, Inc., Chicago, Ill., a corporation of Illinois Application May 19, 1941, Serial No. 394,198

19 Claims. (Cl. 47—1)

The invention relates to a novel method of ventilating, fertilizing, and distributing and retaining moisture in the soil contiguous to growing plants. It also relates to an improved composition of matter from which novel articles of manfacture are formed and used in practicing said method of ventilating and fertilizing the soil and the distribution and retention of moisture therein.

It is well known that soil contained in flower pots, window boxes, and similar receptacles for plants is frequently artificially watered and that as a result the soil in such receptacles tends to become hard, imporous, and lacking in fertility. Since it is impossible to loosen the soil to mix fertilizer therewith in such restricted spaces without injuring the roots of plants growing therein, the soil is permitted to remain hard and lacking in the fertility essential to vigorous plant growth. The soil not only becomes compact but its volume is small in flower pots and window boxes of ordinary dimensions. As a result, the soil dries out quickly and in drying out tends to contract leaving an open space around the edge of the pot or the box. Water added under such conditions flows around the edge and out at the bottom of the receptacle without penetrating to the middle of the pot or box where moisture is most needed. These conditions, tending to retard plant growth, make it desirable that a method and means for practicing the method be provided for delivery of fertilizing materials, air, and moisture to the roots of plants without disturbing or physically injuring the same.

The invention has as one of its objects the provision of a novel method and means for practicing the method of fertilizing, ventilating, and maintaining the porosity of soil contained in flower pots, window boxes and the like, and in other areas contiguous to growing plants without physical injury to or otherwise disturbing the plants in a manner to retard their growth.

Another object of the invention is the provision of a novel method and means for practicing the method of increasing the capillary action in and thereby accelerating the induction of moisture to the soil surrounding plants and augmenting the moisture retention qualities of the soil.

The invention has as another of its objects the provision of a novel method and means for practicing the method of fertilizing and ventilating soil contiguous to growing plants, regardless of whether the plants are growing in receptacles or in open spaces and without necessitating the physical working or manipulation of the soil.

A further object of the invention is the provision of a novel admixture of soluble and insoluble materials in stick form adapted for embedment in the soil contiguous to plants, the sticks being porous and comprising materials of suitable proportions and ingredients to effectively fertilize, aerate, and accelerate induction of moisture to the surrounding soil and to increase the moisture retaining qualities of such soil without physical disturbance thereof.

A still further object of the invention is the provision of sticks of the kind described adapted to be embedded in the soil in vertical position contiguous to growing plants with the tops of the sticks substantially even with the surface of the soil to provide a source of plant nutrition and a permanent column of insoluble materials adapted to increase the capillary action tending to accelerate induction of moisture in and the moisture retention qualities of the soil surrounding the sticks.

Still another object of the invention is the provision of a novel admixture of soil fertilizing and ventilating materials, the ingredients being such and in proportions adapting the admixture to quickly fertilize and to permanently aerate soils to which it is applied.

A still further object of the invention is the provision of an article of manufacture of the kind described which is inexpensive to produce, easily handled, substantially odorless and generally satisfactory for its intended purpose.

Other further and more particular objects and advantages of the invention herein described and illustrated will be obvious to those skilled in the art from the disclosure herein given.

To this end the invention consists in a novel admixture of fertilizing materials and minerals formed into rigid porous sticks adapted to respectively provide columns of soluble fertilizing materials and insoluble ventilating materials contiguous to plants and it also consists in a novel method of treating and preparing said materials to adapt them both as an available source of fertilizing material for plants and as media for permanently aerating the surrounding soil, accelerating the induction of moisture therein, and increasing the moisture retention qualities of the soil by augmenting the capillary action adjacent to the roots of plants.

In the drawing wherein like reference characters indicate like or corresponding parts:

Fig. 1 is a perspective view of an article of manufacture embodying the principles of the invention;

Fig. 2 is a view of the article or stick shown in Fig. 1 as it appears after embedment in soil for a sufficient length of time that the soluble constituents thereof have been dissolved and distributed through the soil leaving its insoluble constituents as a permanent column having numerous interconnected interstices through which air and moisture circulate and are permitted to pass to the roots of contiguous plants; and Fig. 3 is a section drawn to a larger scale taken along the line 3—3 of Fig. 1.

Referring now more particularly to the drawing, the numeral 10 generally designates an article of manufacture originally in the form of a rigid stick or cylinder formed from a soft plastic mass or admixture of materials. It is well known that capillary action is an important factor in the growth of vegetation since it is by such action that nutrients, moisture and air are absorbed from the soil by roots of growing plants. The admixture from which the sticks 10 are formed consists of soluble ingredients, generally designated by the numeral 11, and of insoluble ingredients designated by the numeral 12.

The soluble ingredients 11 of the admixture are nutrients suitable as food for plants and are chiefly of organic content. The sticks 10 are embedded in the soil 13 as shown in Fig. 2 and the soluble ingredients thereof are gradually released and made available for absorption by the roots of plants growing contiguous to the sticks. In the course of time there remains of the stick 10 only the insoluble particles or materials 12 as shown in Fig. 2. The length of time a stick 10 may serve as a source of plant nutrient depends upon a number of features, but for sticks of the composition and dimensions hereinafter suggested it is found by experiment and observation that nutrients appear to be delivered by the sticks to the soil for a period of two or three months after the sticks are first embedded.

As the materials 11 are dissolved and taken up by the soil they leave a plurality of interconnected spaces 14 between the insoluble particles in the sticks 10. The spaces 14 increase in size and number until the ingredients 11 are all taken up by the surrounding soil. The spaces 14 increase the capillary action essential to vigorous plant growth by accelerating the induction of moisture and augmenting the moisture retention qualities of the soil. In other words the sticks thereby become permanent ventilating columns permitting free circulation of air and moisture in every direction therethrough whereby there is an acceleration and increase of the capillary action essential to the assimilation of the soluble materials and particularly the assimilation of the organic constituents of the nutrients fed to the plants through the roots.

The admixture may comprise approximately 56 parts by weight of fertilizing materials 11, and 27 parts by weight of porous materials 12. The materials in 11 consist of a fertilizer mixture, chiefly of organic content, and comprise approximately 10% nitrogen, 20% phosphoric acid, in an organic packing house mixture of blood, bone, and a concentrate, commonly known as tankage, and approximately 10% potash subsequently added to the organic materials to make a balanced fertilizer of approximately 5% nitrogen, 10% phosphoric acid and 5% potash. The porous aggregate ingredients used are preferably vermiculite particles small enough to pass through a No. 10 mesh screen. The vermiculite ingredients are processed from crude ores by dehydration at temperatures ranging from 1200° F. to 2200° F., according to the hydrous content of the ore being treated. As is well known vermiculite has an accordion like or cellular structure and its dehydration is for the purpose of enlarging or increasing its porosity or the cellular condition of its laminae.

The admixture may also consist of ingredients in the following proportions by weight, vermiculite 40 parts, potash 16 parts, steamed bone 15 parts, fertilizer tankage 14 parts, dried blood meal 8 parts, superphosphate 5 parts and urea 2 parts. The fertilizer tankage ingredient is the waste material usually designated by that name in packing house circles.

The above designated ingredients are preferably mixed dry, and to this dry admixture is then added approximately 10 parts by weight of asbestos floats and 6.5 parts by weight of starch, the asbestos and starch being added to the dry mass as a paste made up with 20 parts by weight of water. Sufficient water is next added to the admixture to make a relatively soft mass and to obtain the desired degree of soft plasticity as described above, the weight of the added water in general being approximately equal to the weight of the mass to which it is added. The vermiculite particles are in general larger than the particles of soluble materials so that the vermiculite is distributed through the mass as an "aggregate" in the same manner that the crushed stone ingredients of concrete are distributed with the pasty mass of porous materials filling the interstices between the vermiculite particles. The processing of the vermiculite not only increases its adaptability for absorption of odoriferous gases from the fertilizing material so that the admixture is substantially odorless, but its presence as an ingredient of the admixture is also highly important in that it augments the porosity in an amount such that air may readily circulate through the admixture after it is dried.

Water added to the admixture and thoroughly mixed therewith in the proportions mentioned, renders the mass relatively soft and plastic and adapts it to be extruded from any suitable device operating similarly to an ordinary sausage casing stuffer. It is important that the material be extruded in as soft a condition as possible since only slight pressure is required for its extrusion in that condition, and as a result, the mass is not compacted or compressed, nor is its original porosity diminished. If a relatively stiff instead of a soft plastic admixture is used, extrusion thereof would require substantial pressure tending to compact not only the soluble materials but also tending to compress the accordion like particles of vermiculite and thus would correspondingly diminish its porosity, hence it is highly desirable that the mass be relatively soft initially. The starch acts as a binder for the vermiculite body and gives it its form retaining property. Starch is nontoxic to plants and when it becomes moist in the soil it dissolves thereby rendering the vermiculite more porous thereby greatly adding to its ventilating properties.

The sticks 10 may be of any suitable cross section and dimensions but for ordinary use they are preferably extruded in cylindrical form with diameters of approximately ⅜ of an inch. The extruded cylinders or sticks are delivered onto trays or sheet metal plates providing V-shaped grooves or similar receptacles adapted to guide and maintain the extruded material against the bending or distortion thereof which would otherwise occur by reason of its plasticity. The material so extruded is then dried, preferably artificially by placing the trays or plates containing it in a drier. Since the initial moisture content of the plastic cylinders is relatively high, the soluble ingredients when dried are more or less filled with pores due to the loss of moisture and these pores tend to facilitate the circulation of air and moisture throughout the material and adapt the sticks 10 formed therefrom to function as ventilating columns for soil as soon as they are embedded therein.

The dehydrated vermiculite particles 12 contained in the admixture add very substantially to the porosity of the sticks 10. The ratio of the volume of the cells or pores in the vermiculite ingredient 12 to the total volume of the vermiculite particles is suggested by the decrease in weight of the vermiculite to from 8 to 15 pounds per cubic foot after processing as compared with its weight of from 60 to 80 pounds per cubic foot before it is dehydrated. The processed vermiculite, thus filled with cells or pores, retains its cellular or porous structure unchanged, both when mixed with the ingredients 11 and when in extruded stick form, since the extrusion is accomplished at such low pressures that few, if any, of the cells or pores of the vermiculite are filled or closed by the other ingredients. The suggested proportions of vermiculite in the admixture is such that the vermiculite particles are more or less in contact. The volume of the spaces 14 between the particles of vermiculite is approximately two or three times that of the vermiculite particles and the spaces are substantially filled with the ingredients 11 of the soft admixture. In drying the admixture the fertilizing materials 11 which initially fill or partially fill the spaces between the vermiculite particles become contracted and provide additional air spaces. The dried cylinders not only have a high degree of initial porosity but are sufficiently rigid to be handled without breaking. The cylinders may be of any desired diameter and of any convenient length as determined by the size of the tray or palette upon which they are extruded. After drying, the cylinders are cut to provide individual sticks 10 of any suitable length. Sticks 10 having the suggested diameter of ⅜ of an inch and the suggested length of two inches are preferred for use in flower pots and window boxes of ordinary depth and capacity.

Thus, it will be seen that the invention provides a novel method of increasing the capillary action in soils adjacent to the roots of growing plants by acceleration of the induction of moisture and air to the soil and augmenting the moisture retention qualities of the soil and it also consists in a novel admixture of soluble and insoluble materials in stick form for use in practicing the method.

Having thus described our invention, it is obvious that various immaterial modifications may be made in the same without departing from the spirit of our invention; hence, we do not wish to be understood as limiting ourselves to the exact form, construction, arrangement, and combination of parts herein shown and described or uses mentioned.

What we claim as new and desire to secure by Letters Patent is:

1. As a new article of manufacture, a preformed unitary member having a body structure of vermicularly shaped pieces adapted for retardingly confining plant nutrients and to provide ventilation for the roots of plants, a binder for said vermicularly shaped pieces, and plant nutriments contained in the cells in and between the particles comprising the body structure.

2. A stick of hardenable plastic composition comprising an aggregate consisting of particles of cellular porous micaceous materials, a binder therefor, and a filler containing soluble fertilizing materials.

3. As a new article of manufacture a hardenable plastic composition in stick form comprising an aggregate of dehydrated particles of vermiculite and a filler of fertilizer materials, said fertilizer comprising 60% of organic materials suitable as fertilizers and 40% soluble or available ingredients and in the proportions of 10% nitrogen, 20% phosphoric acid and 10% potash.

4. As a new article of manufacture, a hardenable plastic composition in stick form comprising an aggregate of vermiculite, a binder therefor, and a filler containing fertilizing materials adapted to form a ventilating column and to accelerate capillary action when positioned in the soil adjacent to the roots of growing plants, the proportion of the vermiculite in the admixture being such as to adapt the sticks as ventilating columns after dissolution and leaching out of the soluble ingredients.

5. As a new article of manufacture an admixture in stick form comprising fertilizing materials, including phosphoric acid, nitrogen and potash in soluble form, and vermiculite ore dehydrated to increase its porosity, to adapt the stick as a ventilating column for the roots of plants when embedded in the soil, and a binder for said vermiculite ore, the proportion of vermiculite in the admixture being such as to adapt the sticks as ventilating columns after dissolution and leaching out of the soluble ingredients.

6. As a new article of manufacture an admixture in dried stick form of soluble organic and inorganic fertilizing materials, and dehydrated vermiculite ore and a binder for the vermiculite ore, the proportion of vermiculite in the admixture being such as to adapt the sticks as ventilating columns after dissolution and leaching out of the soluble ingredients.

7. An admixture in stick form comprising by weight approximately 27 parts of vermiculite, 10 parts of asbestos floats, 6.5 parts of starch, 56 parts of fertilizing material including 10% nitrogen, 20% phosphoric acid, and 10% potash, and approximately 105 parts by weight of water to provide a plastic mass.

8. An admixture comprising by weight approximately 40 parts of vermiculite dehydrated as described, 16 parts of potash, 15 parts of steamed bone, 14 parts of fertilizer tankage, 8 parts of dried blood meal, 5 parts of superphosphate, and 2 parts of urea.

9. An admixture comprising by weight approximately 40 parts of vermiculite dehydrated as described, 16 parts of potash, 15 parts of steamed bone, 14 parts of fertilizer tankage, 8 parts of dried blood meal, 5 parts of superphosphate, 2 parts of urea, 10 parts of asbestos floats, and 6.5 parts of starch.

10. An admixture consisting of dry ingredients in the following approximate proportions by weight: 40 parts of vermiculite dehydrated as described, 16 parts of potash, 15 parts of steamed bone, 14 parts of fertilizer tankage, 8 parts of dried blood meal, 5 parts of superphosphate, and 2 parts of urea; and a pasty mass commingled with said dry ingredients, said mass consisting by weight of approximately 10 parts of asbestos floats, 6.5 parts of starch, and water in sufficient amount to form a paste.

11. An admixture comprising by weight approximately 40 parts of vermiculite dehydrated as described, 16 parts of potash, 15 parts of steamed bone, 14 parts of fertilizer tankage, 8 parts of dried blood meal, 5 parts of superphosphate, 2 parts of urea, 10 parts of asbestos floats, 6.5 parts of starch, and water added in sufficient amount to form a soft plastic mass of said admixture.

12. A stick formed by extrusion from an admixture comprising by weight approximately 40 parts of vermiculite dehydrated as described, 16 parts of potash, 15 parts of steamed bone, 14 parts of fertilizer tankage, 8 parts of dried blood meal, 5 parts of superphosphate, 2 parts of urea, 10 parts of asbestos floats, 6.5 parts of starch, and water in sufficient amount to form a soft plastic mass of said admixture.

13. An admixture in the form of a stick comprising by weight approximately 40 parts of dehydrated vermiculite, 16 parts of potash, 15 parts of steamed bone, 14 parts of fertilizer tankage, 8 parts of dried blood meal, 5 parts of superphosphate, 2 parts of urea, 10 parts of asbestos floats, 6.5 parts of starch, and water in sufficient amount to form a plastic mass.

14. An admixture in the form of a stick comprising by weight approximately 27 parts of vermiculite, 10 parts of asbestos floats, 6.5 parts of starch, 56 parts of fertilizing material including 10% nitrogen, 20% phosphoric acid, and 10% potash, and approximately 105 parts by weight of water added to provide a plastic mass.

15. A substantially odorless plant fertilizing and ventilating stick of the kind described comprising an admixture of selected fertilizing materials and dehydrated vermiculite adapted for absorption of odoriferous gases emanating from the fertilizing materials.

16. The method of fertilizing and ventilating the roots of growing plants which consists in the provision of a soft plastic admixture of selected fertilizing materials and dehydrated vermiculite ore, extruding the admixture, drying the extruded admixture and forming it into sticks, and placing the sticks in the soil contiguous to the plants to provide ventilating columns.

17. The method of fertilizing and ventilating the roots of growing plants which consists in the provision of an admixture of selected fertilizing materials and porous nonsoluble vermiculite, forming a hard porous stick from said admixture, then placing the stick in the soil contiguous to the plant.

18. The method of producing a hardenable plastic composition of matter, comprising mixing together approximately 56 parts by weight of fertilizing materials with 27 parts by weight of porous insoluble dehydrated vermiculite material to form a dry admixture, then mixing water with the admixture in sufficient quantity to obtain a soft plasticity adapting the admixture to be extruded under relatively slight pressure, then extruding the admixture and permitting it to dry, then severing the extruded material to form sticks of suitable length.

19. The method of fertilizing and ventilating the roots of plants comprising mixing selected soluble fertilizing materials, dehydrated vermiculite ore and a binder therefor, adding liquid to said mixture to provide a soft plastic mass, forming said resultant mass into definitely shaped pieces, drying said pieces to change the same from plastic state to rigid bodies, and inserting the latter into the soil adjacent the plants to establish a potential source of plant food and to provide ventilating columns.

RICHARD MARTIN.
HARRY T. BELLAMY.